United States Patent
Hooper, III (10) Patent No.: US 7,013,376 B2
(45) Date of Patent: Mar. 14, 2006

(54) METHOD AND SYSTEM FOR DATA BLOCK SPARING IN A SOLID-STATE STORAGE DEVICE

(75) Inventor: William G. Hooper, III, Orangevale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 767 days.

(21) Appl. No.: 09/746,328

(22) Filed: Dec. 20, 2000

(65) Prior Publication Data

US 2002/0120824 A1    Aug. 29, 2002

(51) Int. Cl.
 *G06F 12/10*    (2006.01)
(52) U.S. Cl. .................... 711/202; 711/103
(58) Field of Classification Search ............. 711/153, 711/202–210, 102–104; 365/193, 233
See application file for complete search history.

(56) References Cited

U.S. PATENT DOCUMENTS

| | | | |
|---|---|---|---|
| 5,907,856 A | 5/1999 | Estakhri et al. ............ 711/103 |
| 5,933,852 A * | 8/1999 | Jeddeloh ..................... 711/153 |
| 6,000,006 A * | 12/1999 | Bruce et al. ................ 711/103 |
| 6,149,316 A | 11/2000 | Harari et al. ............... 395/182 |
| 6,269,432 B1 * | 7/2001 | Smith ........................ 711/162 |
| 6,397,292 B1 * | 5/2002 | Venkatesh et al. .......... 711/114 |
| 6,535,995 B1 * | 3/2003 | Dobbek ........................ 714/8 |

* cited by examiner

*Primary Examiner*—Matthew D. Anderson
*Assistant Examiner*—Hetul Patel (57) ABSTRACT

A method and system for enhancing the reliability of a solid-state storage device based on electronic memory. The electronic memory is organized into low-address and high-address spare table regions, low-address and high-address spare page regions, and a large data page region. Data blocks within the memory are specified by accessing devices using a logical data block address, including a page index and a data block index. The page index selects a particular spare table, a particular spare page, and a particular data page. The data block index selects a spare table element within the spare table, and a data block within a data page. When an LDBA has been remapped, information in a corresponding spare table element is used to locate a physical block within a spare page.

17 Claims, 4 Drawing Sheets

METHOD AND SYSTEM FOR DATA BLOCK SPARING IN A SOLID-STATE STORAGE DEVICE

TECHNICAL FIELD

The present invention relates to methods and systems that enhance the reliability of solid-state storage devices, and, in particular, to a method and system that provides space-efficient and easily accessed spare blocks within a solid-state block storage device that can be automatically substituted for failed or defective blocks.

BACKGROUND OF THE INVENTION

Magnetic disk drives provide inexpensive, non-volatile storage of large amounts of electronic data, high rates of data transfer, and high reliability over large numbers of read and write cycles. For these reasons, magnetic disk drives are the predominant mass storage devices in current computer systems. As with any physical material, the surfaces of rotating magnetic media are subject to manufacturing defects and defects that arise during use due to mechanically and electrically induced stresses. In order to enhance the reliability of magnetic media, sophisticated defect-circumventing mechanisms have been developed to map defective data storage regions of a magnetic medium to available, unused, spare data storage regions provided on the magnetic medium. A variety of methods for remapping defective areas have been developed and are currently in use. Most depend on provision of extensive lookup tables that are interspersed with data-containing regions of the magnetic medium.

With the continuing decrease in cost, and increase in capacity, of integrated-circuit electronic memory devices, solid-state, storage devices have become an increasingly fast data storage and data retrieval characteristics of electronic memory are needed. In such applications, the higher data transfer rates of solid-state storage devices with respect to magnetic disk drives may offset and justify the higher cost, per data unit stored, of solid-state storage devices versus magnetic disk drives.

Just as regions of the surfaces of magnet disk drives may contain manufacturing defects, or may become defective through use, data-storage cells within an electronic memory may be defective upon manufacture or may fail during use. Just as in magnetic disk drives, solid-state storage devices need to provide enhanced overall reliability by detecting defective memory cells and providing spare memory cells as substitutes for defective memory cells. However, magnetic data storage medium is relatively cheap, so that use of a relatively large fraction of the physical data storage medium for remapping tables in magnetic disk drives does not significantly increase the overall cost of a magnetic disk drive. Moreover, because of relatively long latency times for data access, arising from the need to mechanically position read/write heads over a target data storage region, complex remapping calculations may be undertaken in magnetic disk drives without significantly increasing access times and decreasing data transfer rates. In solid-state storage devices, by contrast, the physical storage medium is expensive, and therefore the use of a relatively large fraction of the medium for remapping tables can significantly increase the overall price of a solid-state storage device and significantly decrease the solid-state storage device's cost effectiveness in a given application, and complex remapping calculations directly increase access times and decrease data transfer rates. For these reasons, designers, manufacturers, and users of solid-state storage devices have recognized the need for a method and system for dynamically substituting spare memory cells to replace defective memory cells in the solid-state storage device that does not employ large remapping tables and complex remapping calculations.

SUMMARY OF THE INVENTION

The present invention provides a method and system for enhancing the reliability of a solid-state storage device by remapping the addresses of defective data blocks stored within the solid-state storage device to unused, non-defective data blocks. The linear sequence of data-storage units within the electronic memory of the solid-state storage device are addressed by monotonically increasing integer addresses, and are divided, under the present invention, into five regions: (1) low-address spare tables that store the remapping status and remapping address information for defective data blocks; (2) low-address spare pages, each spare page containing a fixed number of replacement, or spare, data blocks; (3) data pages each containing a fixed number of data blocks; (4) high-address spare pages that each contain a fixed number of spare data blocks; and (5) high-address spare tables that redundantly store the information stored in the low-address spare tables.

A data block, comprising a fixed number of bytes, is addressed in the solid-state storage device by a logical data block address formed by the concatenation of a page index and a data block index. The page index selects a particular spare table from the low-address and high-address spare table regions, a particular spare page within the low-address and high-address spare page regions, and a particular data page within the data page region. The data block index portion of the logical data block address selects a particular element from a spare table, a particular data block from a spare page, and a particular data block from a data page. A logical data block address is resolved by the solid-state data storage device into a physical data block address by first checking the status of a spare table element associated with the logical data block address to determine whether or not the logical data block address has been remapped. If the logical data block has been remapped, offset information in the spare table, along with the page index and data block address, are used to select the physical address of a spare data block within a spare page. If the status information within the spare table associated with a logical data block address indicates that the logical data block address is not remapped, then the page index and data block index components of the logical data block address are used to select the physical address of a data block within a data page. In either case, the selected physical address is the address of the data block within the solid-state data storage device corresponding to the logical data block address.

DETAILED DESCRIPTION OF THE INVENTION

The present invention provides a method and system for addressing data blocks within a solid-state data storage device that additionally provides space-efficient and computationally efficient bad data block replacement. First, with references to FIGS. 1–4, an overview of one generalized embodiment of the present invention is provided below. Following that overview, a detailed C++-like pseudocode implementation of a specific embodiment of the present invention is provided. C++-like pseudocode is chosen for conciseness of description and for its broad use and acceptability in the engineering community. The present invention may most commonly be implemented directly in hardware circuits or in firmware. Such implementations are specified in relatively high-level specification languages that are compiled either to integrated circuits or to firmware instructions.

Figure 1:
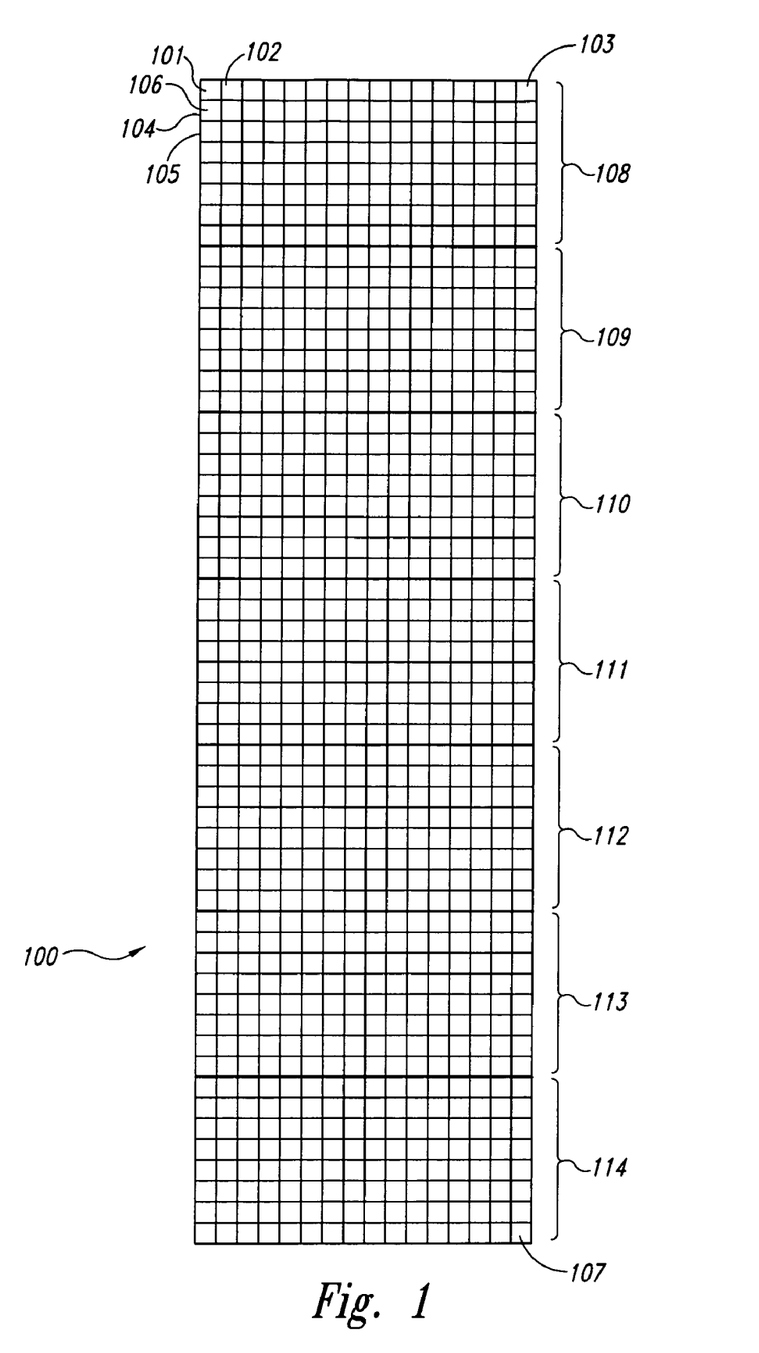
FIG. 1 illustrates physical addressing of data storage units within a solid-state data storage device.

FIG. 1 illustrates physical addressing of data storage units within a solid-state data storage device. A convenient fundamental data storage unit widely used in the computer industry is called a "byte," a physical representation of an unsigned integer with a value ranging from 0 to 255, stored in eight binary digits, or bits. Commonly, the bytes composing electronic memory are uniquely addressable. The entire electronic memory may be thought of as a very long, linear sequence of bytes starting from an initial byte with address 0 and ending with a final byte having an address equal to the total number of bytes in the memory minus one. Although the present invention will be describe in terms of a byte-addressable electronic memory, the present invention is equally applicable to electronic memories using different basic units of data storage, for example, 32-bit integers or 64-bit integers, and is applicable to electronic memories employing more complex addressing mechanisms. When electronic memories with more complex address mechanisms are employed, the physical addresses can be transformed into virtual physical addresses for a virtual sequential ordering of discretely addressed data storage entities.

Electronic memories are commonly illustrated as grid-like, two-dimensional arrays, such as the two-dimensional array 100 shown in FIG. 1. The data unit ordering convention in such illustrations can be chosen arbitrarily. In FIG. 1, the first byte, having address "0," occupies cell 101, the second byte having address "1" occupies cell 102, and the sixteenth byte, having address "15," occupies cell 103. The linear sequence of bytes starting with byte 0 (101 in FIG. 1) and ending with byte 16 (103 in FIG. 1) compose a row, and the electronic memory can be alternatively considered to be a sequence of rows of data units, the second row 104 directly following the first row, and the third row 105 following the second row 104. In the convention employed in FIG. 1, the seventeenth byte, having address "16," occupies cell 106, the first cell in row 104. The final byte in the electronic memory, according to the convention of FIG. 1, occupies cell 107 at the lower right-hand corner of the two-dimensional array 100.

A higher-level organization of the memory can be superimposed on a basic linear byte address space. As one example, some fixed number of sequential bytes may be considered to compose a block. In FIG. 1, the first 128 bytes of the memory together compose a first block 108 within the memory, and subsequent groupings of 128 sequential bytes compose blocks 109–114.

The electronic memory illustrated in FIG. 1 can be illustrated in a large number of ways. For example, instead of rows of sixteen bytes, one could choose rows of 128 bytes. In that case, each 128-byte block would occupy one row. The number of individually addressable data units within a block is also arbitrary. In a preferred embodiment of the present invention, data blocks within a solid-state data storage device each comprise 512 bytes. While the size of individually addressable data units, blocks, and the memory as a whole are relatively arbitrary, these fundamental parameters are normally chosen to be numbers that can be represented as powers of two, allowing for efficient addressing bit fields.

Figure 2:
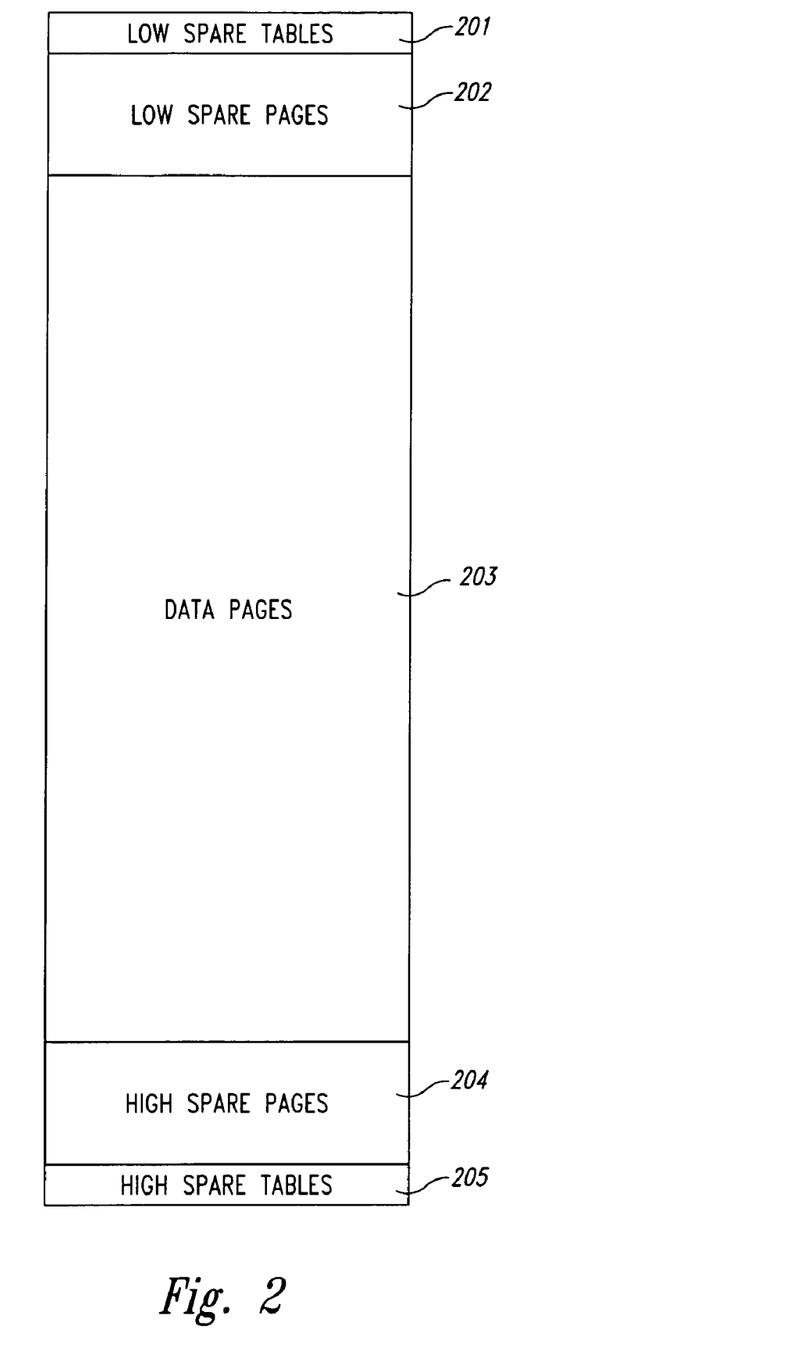
FIG. 2 illustrates the high-level organization of electronic memory of a general embodiment of the present invention.

FIG. 2 illustrates the high-level organization of electronic memory of a general embodiment of the present invention. The organization as illustrated in FIG. 2 is superimposed upon a sequential block organization of memory that is itself superimposed on a linear, sequentially addressed byte organization described in FIG. 1. The memory, or memory address space, is divided into five regions: (1) low-address spare tables 201, a region containing one spare table for each data page, each spare table containing one element for each data block within a data page, each element of a spare table containing a spare status and spare offset to indicate whether or not the corresponding block of a corresponding data page has been remapped and, in the case that the data block within the data page has been remapped, the offset used to locate the replacement block within a spare page; (2) low-address spare pages 202, a region containing a spare page for each data page, each spare page containing a fixed number of replacement, or spare, data blocks; (3) data pages 203, a region containing data pages, each data page containing a fixed number of data blocks; (4) high-address spare pages 204, a region containing a spare page for each page in the data pages region, each spare page containing a fixed number of spare data blocks; and (5) high-address spare tables 205, a region containing redundant copies of the spare tables contained in the low-address spare tables region 201.

Figure 3:
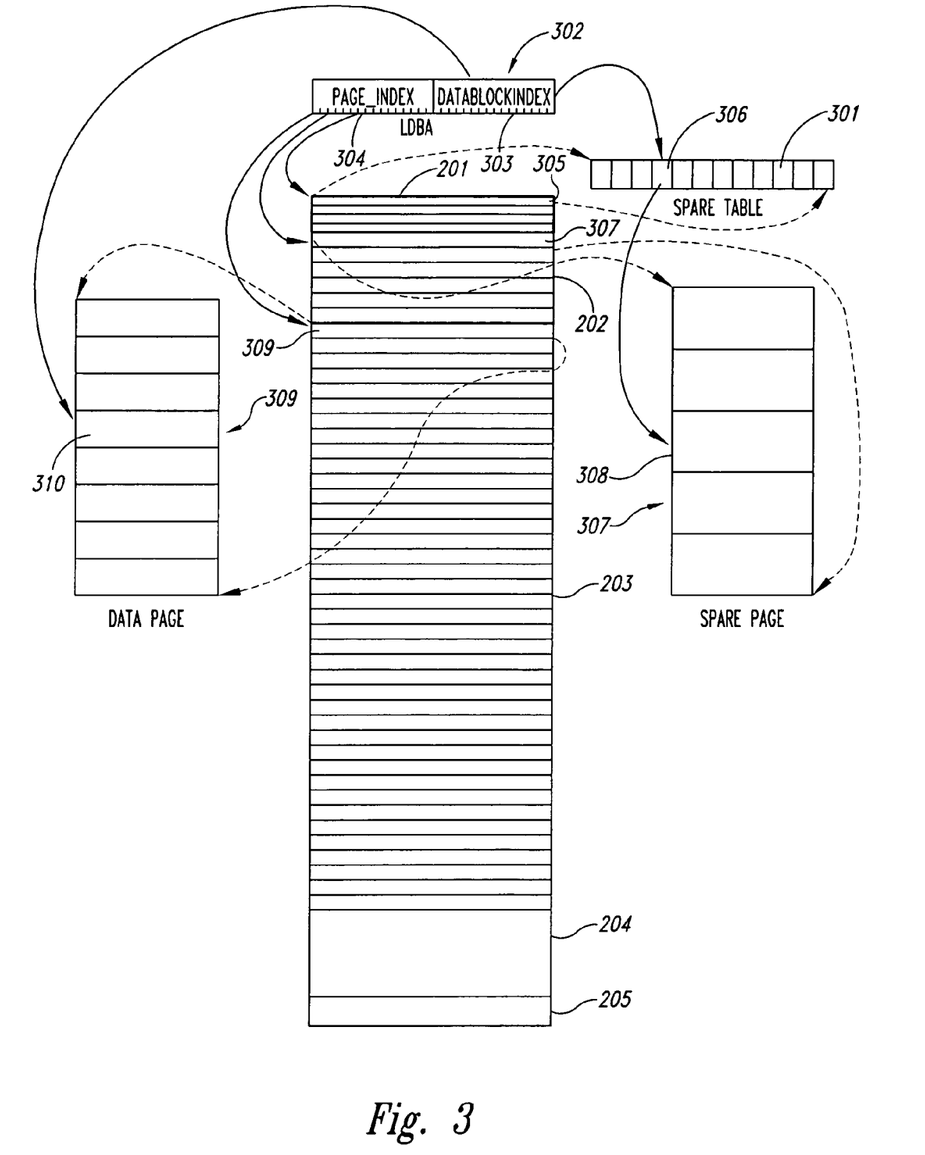
FIG. 3 illustrates block addressing employed in a generalized embodiment of the present invention.

FIG. 3 illustrates block addressing employed in a generalized embodiment of the present invention. A solid-state data storage device provides a block-read and block-write interface for accessing devices, such as computers. The accessing device specifies a block for reading or writing using a logical data block address ("LDBA") 302. In a preferred embodiment of the present invention, an LDBA contains a total of 32 bits or is, in other words, a 32-bit unsigned integer, but alternative embodiments may use different sized LDBAs. From the standpoint of the accessing device, the accessing device may access any one of $2^x$ data blocks stored within the solid-state data storage device, where x is some number of bits equal to, or less than, the total of bits that compose an LDBA. However, from the standpoint of the solid-state data storage device, an LDBA is composed of two fields: (1) a data-block-index field 303; and (2) a page-index field 304. In a preferred embodiment of the present invention, the data-block-index field is composed of sixteen lower address bits and the page-index field is composed of sixteen higher-address bits within the LDBA.

Figure 4:
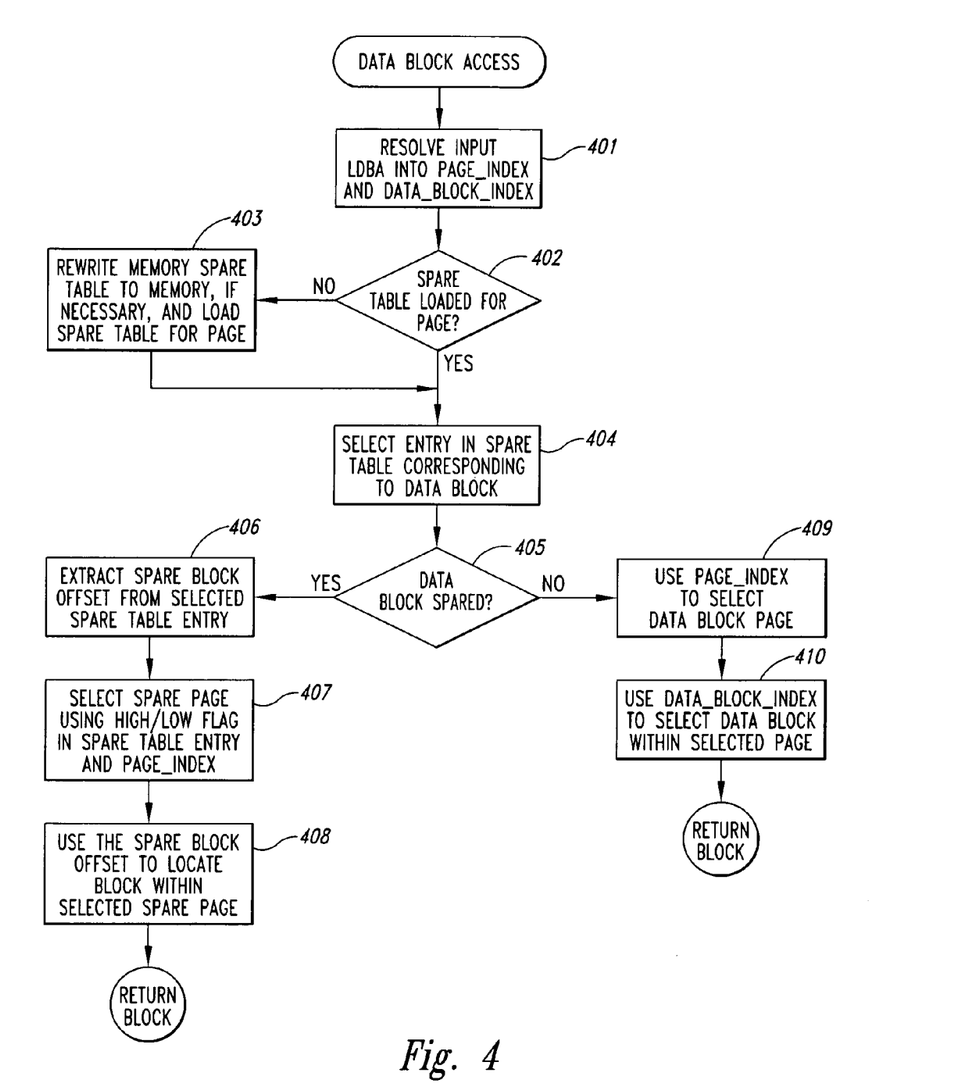
FIG. 4 is a flow-control diagram of the logical-data-block-address to physical-data-block-address translation within a solid-state storage device.

The solid-state storage device translates an LDBA into a physical address in order to carry out a read-block or write-block operation specified in terms of an LDBA. FIG. 4 is a flow-control diagram of this process, and the process will be described with reference to both FIG. 3 and to FIG. 4. First, the solid-state storage device, in step 401 of FIG. 4, resolves a supplied LDBA 302 into a page index 304 and a data-block index 303. Next, in step 402, the solid-state storage device determines whether the spare table corresponding to the page index has been currently loaded into a high-speed local memory. To make this determination, the solid-state storage device compares a register that contains the page index corresponding to the currently loaded spare table to the page index extracted from the LDBA in step 401. If the currently-loaded spare table is not the spare table that corresponds to the page index extracted from the LDBA, then in step 403, the solid-state data storage device uses the extracted page index 304 as an offset into the low-address spare table region 201 to retrieve the spare table 305 corresponding to the extracted page index 304. Should the solid-state device fail to retrieve the spare table from the low-address spare table region, a redundant copy of the spare table may be retrieved instead from the high-address spare table region. Next, in step 404, the solid-state storage device employs the data block index extracted from the LDBA as an offset into the spare table 305 to select a spare table element 306 corresponding to the LDBA. In step 405, the solid-state storage device uses a data field within the spare table element 306 to determine whether or not the LDBA has been remapped to a spare block. If the LDBA has been remapped, then steps 406–408 are carried out to determine the physical address of the spare block corresponding to the LDBA. Otherwise, steps 409 and 410 are carried out to determine the physical address of the data block within the data page region of memory 303 corresponding to the LDBA. In step 406, the solid-state storage device extracts an offset from the spare table entry 306. In step 407, the solid-state storage device selects a spare page from either the low-address spare page region 202 or the high-address spare page region 204. The status extracted from the spare table element 306 indicates from which spare page region to select the spare page. The solid-state storage device uses the extracted page index as an offset into the appropriate spare pages region to select the spare page 307 that contains the spare data block corresponding to the LDBA. Finally, in step 408, the solid-state storage device uses the offset extracted from the spare table element 306 in step 406 as a block offset within the spare page 307 to locate the physical block 308 corresponding to the LDBA. When no remapping of the LDBA has occurred, then in step 409, the solid-state storage device uses the extracted page index 304 as an offset into the data page region 203 to locate the data page 309 corresponding to the LDBA. In step 410, the solid-state storage device uses the data-block index 303 as an offset into the data page 309 to identify the physical data block 310 associated with the LDBA.

In a preferred embodiment, each data page contains $2^{16}$ data blocks. Each data block contains 512 bytes. A data page in the preferred embodiment is composed of $2^{16}$ data blocks. A spare table contains $2^{16}$ spare elements, each spare element represented by a single byte. A spare page in the preferred embodiment includes 128 data blocks. Thus, the maximally sized memory that can be addressed in the preferred embodiment contain approximately 2.2 terabytes, less than 1% of which are devoted to spare tables and spare pages. The present invention therefore provides a bad block replacement mechanism and an addressing scheme that is extremely memory-space efficient and that involves simple and straightforward computation based on extracted bit fields and offsets, as described above with reference to FIGS. 3 and 4.

A detailed description of one embodiment of the present invention is presented below in the form of a C++-like pseudocode implementation. The C++-like pseudocode implementation includes a number of constant declarations, several type definitions, an enumeration, and a single class with four private data members, ten private member functions, and four public member functions.

The following type definition and constant declarations are the fundamental parameters for the embodiment:
1 typedef unsigned char BYTE;
2 const int BYTE_SIZE=8;
3 const int NUM_DATA_BLOCKS_IN_SPARE_PAGE=4;
4 const int BLOCK_SIZE=128;
5 const int PAGE_INDEX_SIZE=4;
6 const int DATA_BLOCK_INDEX_SIZE=4;

The type declaration and constant declaration on lines 1 and 2, above, define BYTE to be the familiar 8-bit, fundamental, addressable data storage entity. The constant "NUM_DATA_BLOCKS_IN_SPARE_PAGE," declared on line 3, is the number of data blocks contained in a spare page. The constant "BLOCK_SIZE," declared on line 4, is the size, in bytes, of a block in the described embodiment. The constant "PAGE_INDEX_SIZE," declared on line 5, is the size of the page-index field of an LDBA, and the constant "DATA_BLOCK_INDEX_SIZE," declared on line 6, is the size, in bits, of the data-block-index field of an LDBA.

An additional set of constant integer declarations derived from the above fundamental constants is provided below:
1 const int NUM_DATA PAGES=16;
2 const int NUM_DATA_BLOCKS_IN_DATA_PAGE=16;
3            const               int NUM_LOW_SPARE_PAGES=NUM_DATA_PAGES;
4            const               int NUM_HIGH_SPARE_PAGES=NUM_DATA_PAGES;
5            const               int NUM_LOW_SPARE_TABLES=NUM_DATA_PAGES;
6            const               int NUM_HIGH_SPARE_TABLES=NUM_DATA_PAGES;
7 const int SPARE_PAGE_SIZE=
8 NUM_DATA_BLOCKS_IN_SPARE_PAGE * BLOCK_SIZE;
9 const int DATA_PAGE_SIZE=
10 NUM_DATA_BLOCKS_IN_DATA_PAGE * BLOCK_SIZE;
11    const    int    SPARE_TABLE_SIZE=NUM_DATA_BLOCKS_IN_DATA_PAGE;

The number of data pages in the data page region (203 in FIG. 2) and the number of data blocks within a data page, declared above on lines 1 and 2, are derived from the size of a page-index field within an LDBA and the size of a data-block-index field within an LDBA, in bits, as follows:

number of data pages=$2^{page\text{-}index\ field\ size}$ number of data blocks in a data page=$2^{data\text{-}block\text{-}index\ field\ size}$ The remaining derived constants are straightforwardly derived from the fundamental constants and are literally named, and will therefore not be described further.

The next set of constant declarations provides offsets, as byte addresses, for the five regions of memory is illustrated in FIG. 2:
1 const int LOW_SPARE_TABLES_OFFSET=0;
2            const               int LOW_SPARE_PAGES_OFFSET=LOW_SPARE_TABLES_OFFSET+
3 (NUM_LOW_SPARE_TABLES * SPARE_TABLE SIZE);
4       const       int       DATA_PAGES_OFFSET=LOW_SPARE_PAGES_OFFSET+
5 (NUM_LOW_SPARE_PAGES*SPARE_PAGE_SIZE);
6    const    int    HIGH_SPARE_PAGES_OFFSET= DATA_PAGES_OFFSET+

```
7  (NUM_DATA_PAGES*DATA_PAGE_SIZE);
8      const    int    HIGH_SPARE_TABLES_
   OFFSET=HIGH_SPARE_PAGES_OFFSET+
9  (NUM_HIGH_SPARE_TABLES * SPARE_PAG-
   E_SIZE);
10 const  int  TOTAL_MEM_SIZE=  HIGH_SP-
   ARE_TABLES_OFFSET+
11 (NUM_HIGH_SPARE_TABLES * SPARE_TABLE_
   SIZE);
```

The following type definition defines a structure representing an LDBA, including a page-index field and a data-block-index field:

```
1  typedef struct ldba
2  {
3      unsigned int page_index: PAGE_INDEX_SIZE;
4      unsigned int data_block_index : DATA_BLOCK_INDEX_SIZE;
5  } LDBA;
```

The following three constant declarations define values for the status field of a spare table entry:

```
1 const int NOT_SPARED=0;
2 const int LOW_SPARE_STATUS=1;
3 const int HIGH_SPARE_STATUS=3;
```

Thus, the status field can indicate whether or not an LDBA has been remapped and, if so, to which spare page region the LDBA has been remapped. Many alternative schemes for encoding spare status are possible. For example, the entire value of the spare status element, considered as a byte may indicate whether or not a corresponding LDBA has been remapped, and a single bit may indicate to which spare page region the LDBA has been remapped.

In the embodiment described by the C++-like pseudocode, a portion of the first block in each spare page is dedicated as a spare block status map, the map comprising a number of bytes equal to the total number of blocks within the spare block page. Each byte of the spare status map may have one of the following values:

```
1 const int SPARES_STATUS_AVAILABLE=0;
2 const int SPARES_STATUS_IN_USE=1;
3 const int SPARES_STATUS_RESERVED=2;
4 const int SPARES_STATUS_BAD=3;
```

The value "SPARES_STATUS_AVAILABLE," declared on line 1, indicates that the corresponding block within the spare page is available for use to remap a data block. The value "SPARES_STATUS_IN_USE," declared above on line 2, indicates that the corresponding block within the spare page is already being used to remap a data block, and the value "SPARES_STATUS_BAD," declared on line 4, indicates that the corresponding block within the spare page is defective and unusable.

The following additional declarations are related to the class "MEMORY," to be described below:

```
1 const int RETRIES=3;
2 enum status {MEMORY_FAILURE, READ_FAILURE,
   OK};
3 typedef BYTE* BYTE_PTR;
```

The constant "RETRIES," declared on line 1, is the number of times that a block access will be retried before the block is considered bad and remapping of the block is undertaken. The enumeration "status," declared on line 2, is a return status for read-block and write-block operations undertaken by the memory device. The type definition on line 3 declares a "BYTE_PTR" to be a pointer to a byte.

The class "MEMORY," provided below, represents in C++-like pseudocode implementation of a solid-state storage device employing one embodiment of the present invention:

```
1   class memory
2   {
3     private:
4         BYTE    mem[TOTAL_MEM_SIZE];
5         BYTE    spareTab[SPARE_TABLE_SIZE];
6         int     lastUsedPageRegister;
7         bool    spareUpdate;
8
9         int     getStatus(BYTE* e) {return (*e >> 6) & 0x3;};
10        int     getOffset(BYTE* e) {return *e & 0x3f;};
11        void    setStatus(BYTE* e, BYTE s) {*e = (*e & 0x3f) | (s << 6);};
12        void    setOffset(BYTE* e, BYTE o) {*e = (*e & 0xc0) | o};
13
14        bool    test(BYTE* blk, int length);
15        bool    writeBackSpare (bool low);
16        bool    spareTable(int pageIndex);
17        bool    dataBlock(LDBA address BYTE_PTR* m);
18        bool    badBlock(LDBA address);
19        bool    map (BYTE* sptb, BYTE* sparePagePtr,
20                     bool low, bool remap, bool testBlocks);
21
22    public:
23        status readBlock (BYTE* buf, LDBA address);
24        status writeBlock (BYTE* buf, LDBA address);
```

```
25    memory();
26    virtual ~memory();
27 };
```

The class "memory" includes the following four private data members: (1) "mem," declared on line 4, a byte array representing the entire electronic memory; (2) "spareTab," declared on line 5, an array of bytes that represents high-speed local memory storing a current spare table; (3) "lastUsedPageRegister," declare on line 6, an integer representing a device register storing the page index corresponding to the spare table stored in spareTab; and (4) "spareUpdate," a Boolean flag indicating whether or not the contents of spareTab have been altered since they were retrieved from memory. The class "memory" contains the following private member functions declared on lines 9–20: (1) "getStatus," an in-line routine that returns the status field of a spare table element; (2) "getOffset," an in-line routine that returns the spare block offset field of a spare table element; (3) "setStatus," an in-line routine that sets the value of the status field of a spare table element; (4) "setOffset," an in-line routine that sets the spare block offset field value of a spare table element; (5) "test," declared above on line 14, a member function that tests a sequential set of bytes described by the arguments "blk" and "length" and returns a Boolean value; (6) "writeBackSpare," declared on line 15, a member function that writes the contents of the data member "spareTab" back to memory; (7) "spareTable," declared on line 16, a member function that retrieves the spare table corresponding to the page index supplied as argument "pageIndex," if necessary, into data member "spareTab;" (8) "dataBlock," declared on line 17, a member function that translates an LDBA supplied as argument "address" into a physical memory address, a pointer to which is returned via argument "m;" (9) "badBlock," declared on line 18, a member function that attempts to remap the LDBA supplied as argument "address;" and (10) "map," declared on line 19, a member function that selects a spare block within a spare page for remapping of a defective data block. The class "memory" contains the following four public member functions, the first two of which define a read block and write block interface used by computers and other electronic devices to interface with the memory: (1) "readBlock," declared above on line 23, that reads a block of data described by the supplied LDBA "address" into the supplied buffer "buff;" (2) "writeBlock," declared above on line 24, that writes a block of data to the supplied LDBA "address" from the supplied buffer "buff;" (3) "memory," a constructor that initializes the memory; and (4) "~memory," declared on line 16, a member function that is called prior to shut down of the memory.

An implementation of the memory member function "test" is provided below:

```
1  bool memory::test(BYTE* blk, int length)
2  {
3
4      int i;
5      BYTE   tmp[SPARE_PAGE_SIZE];
6
7      if (length > SPARE_PAGE_SIZE) length = SPARE_PAGE_SIZE;
8      try
9      {
10         for (i = 0; i < length; i++)
11         {
12             tmp[i] = blk[i];
13         }
14         for (i = 0; i < BLOCK_SIZE; i++)
15         {
16             blk[i] = tmp[i];
17         }
18         return true;
19     }
20     catch ( ... )
21     {
22         return false;
23     }
24 }
```

This member function attempts to read the set of sequential bytes described by the arguments "block" and "length" into a temporary memory, on lines 10–13, and then write the contents of the temporary memory back to memory on lines 14–17. If an error occurs, then the Boolean value "false" is returned on line 22. Otherwise, the Boolean value "true" is returned on line 18.

The memory member function "writeBackSpare" is provided below:

```
1    bool memory::writeBackSpare (bool low)
2    {
3        int i;
4        BYTE* spareTabPtr;
5        BYTE* ptr;
6
7        try
7        {
8            spareTabPtr =
9                low ? mem + LOW_SPARE_TABLES_OFFSET :
10                      mem + HIGH_SPARE_TABLES_OFFSET;
11           spareTabPtr += lastUsedPageRegister * SPARE_TABLE_SIZE;
12           ptr = spareTab;
13           for (i = 0; i < SPARE_TABLE_SIZE; i++)
14               *spareTabPtr++ = *ptr++;
15           return true;
16       }
17       catch ( . . . )
18       {
19           return false;
20       }
21   }
```

The member function "writeBackSpare" writes the contents of the data member "spareTab" back into memory at the appropriate position within either the low-address spare table region (201 in FIG. 2) or the high-address spare table region (205 in FIG. 2) depending on the value of argument "low." On lines 8–10, the variable "spareTabPtr" is set to the address of the first byte of either the low-address spare table region or the high-address spare table region, depending on the value of argument "low." On line 11, an offset to the spare table corresponding to the page index currently stored in member "lastUsedPageRegister" is calculated and added to the value of local variable "spareTabPtr." Finally, in thefor-loop of lines 13–14, the contents of member "spareTab," representing high-speed local memory for storing the spare table corresponding to the page index in lastUsedPageRegiste,r are written back to memory into the memory-resident spare table pointed to by local variable "spareTabPtr."

The memory member function "spareTable" is provided below:

```
1    bool memory::spareTable (int pageIndex)
2    {
3        int i;
4        BYTE* spareTabPtr;
5        bool err = false;
6        BYTE* ptr;
7        bool writebackL, writebackH;
8
9        if (pageIndex == lastUsedPageRegister) return true;
10       if (spareUpdate)
11       {
12           writebackL = writeBackSpare (true);
13           writebackH = writeBackSpare (false);
14           if (!writebackL && !writebackH) return false;
15           spareUpdate = false;
16       }
17
18       try
19       {
20           spareTabPtr = mem + LOW_SPARE_TABLES_OFFSET +
21                   (pageIndex * SPARE_TABLE_SIZE);
22           ptr = spareTab;
23           for (i = 0; i < SPARE_TABLE_SIZE; i++)
24               *ptr++ = *spareTabPtr++;
25
26           lastUsedPageRegister = pageIndex;
27       }
28       catch ( . . . )
29       {
30           err = true;
31       }
32       if (!err) return true;
33       try
34       {
35           spareTabPtr = mem + HIGH_SPARE_TABLES_OFFSET +
36                   (pageIndex * SPARE_TABLE_SIZE);
```

-continued

```
37          ptr = spareTab;
38          for (i = 0; i < SPARE_TABLE_SIZE; i++)
39              *ptr++ = *spareTabPtr++;
40          lastUsedPageRegister = pageIndex;
41          return true;
42      }
43      catch ( ... )
44      {
45          lastUsedPageRegister = -1;
46          return false;
47      }
48  }
```

The member function "spareTable" loads, if necessary, a spare table corresponding to the page index "pageIndex" into data member "spareTab" that represents high-speed local memory. On line 9, spareTable compares the supplied page index to the value stored in member "lastUsedPageRegister." If the two values are equal, then the currently loaded spare table is the spare table corresponding to the supplied page index, no further actions are required, and a Boolean value "true" is returned. Otherwise, a spare table needs to be loaded from memory. If the member "spareUpdate" contains Boolean value "true," as detected on line 10, then the spare table currently stored in member "spareTab" has been updated since retrieval from memory, and must be written back to memory. The member function "writeBackSpare" is called twice, on lines 12 and 13, to write the currently loaded spare table back to the low-address and high-address spare table regions (201 and 205 in FIG. 2, respectively). If both write back operations fail, as detected on line 14, then a Boolean value "false" is returned, indicating a basic memory failure. Otherwise, spareTable attempts to load the spare table corresponding to the supplied page index into member "spareTab." SpareTable first attempts to load the spare table from the low-address spare table region on lines 20–26. If that fails, then spareTab attempts to load the spare table from the high-address memory region on lines 35–40. If that second attempt fails, then spareTab returns the value "false" on line 46. If a spare table is successfully copied from memory to member "spareTab," then the member "lastUsedPageRegister" is updated, on lines 26 or 40, to contain the page index to which the spare table corresponds.

Memory member function "dataBlock" is provided below:

```
1   bool memory::dataBlock(LDBA address, BYTE_PTR* m)
2   {
3       BYTE* sptb;
4       BYTE* sparePagePtr;
5       int status;
6
7       if (!spareTable(address.page_index)) return false;
8       sptb = spareTab + address.data_block_index;
9
10      status = getStatus(sptb);
11      if (status)
12      {
13          if (status == LOW_SPARE_STATUS)
14              sparePagePtr = mem + LOW_SPARE_PAGES_OFFSET +
15                  (address.page_index * SPARE_PAGE_SIZE);
16          else
17              sparePagePtr = mem + HIGH_SPARE_PAGES_OFFSET +
18                  (address.page_index * SPARE_PAGE_SIZE);
19          *m = sparePagePtr + (BLOCK_SIZE * getOffset(sptb));
20          return true;
21      }
22      else
23      {
24          *m = mem + DATA_PAGES_OFFSET +
25              (DATA_PAGE_SIZE * address.page_index) +
26              (BLOCK_SIZE * address.data_block_index);
27          return true;
28      }
29  }
```

Member function "dataBlock" represents the LDBA-to-physical-address translation carried out by a solid-state storage device and illustrated in the flow-control diagram of FIG. 4. The contents of the byte pointer "m" are updated by member function "dataBlock" to point to the first byte of a data block described by the supplied LDBA "address." On line 7, dataBlock calls member function "spareTable" to load, if necessary, the spare table corresponding to the page index extracted from LDBA "address." If a spare table cannot be loaded, then dataBlock returns the Boolean value "false" on line 7. On line 8, dataBlock sets the local variable "sptb" to point to the spare table element corresponding to the data block described by the supplied LDBA "address." On line 10, dataBlock retrieves the status field from the spare table element pointed to by local variable "sptb" into local variable "status." If the status is non-zero, as detected by dataBlock on line 11, then the LDBA "address" has been remapped. In that case, dataBlock sets the local variable "sparePagePtr" to the address of the spare block from the spare page corresponding to LDBA "address" on either line 14 or line 17, depending on whether the spare page resides in the low-address spare page region (202 in FIG. 2) or the high-address spare page region (204 in FIG. 2). Finally, on line 19, the contents of byte pointer "m" are set to the address of the spare data page within the spare page indicated by the contents of the offset field of the spare table element pointed to by local memory "sptb." If the LDBA "address" has not been remapped, then the contents of the byte pointer "m" are set to point to the data block within the data page corresponding to LDBA "address" on lines 24–26.

The memory member function "badBlock" is provided below:

```
1    bool memory::badBlock(LDBA address)
2    {
3        BYTE* sptb;
4        BYTE* sparePagePtr;
5        bool err = false;
6        bool foundSpare = false;
7        int status;
8
9        if (!spareTable(address.page_index)) return false;
10
11       sptb = spareTab + address.data_block_index;
12       status = getStatus(sptb);
13
14       if (status)
15       {
16           if (status == LOW_SPARE_STATUS)
17           {
18               sparePagePtr = mem + LOW_SPARE_PAGES_OFFSET +
19                       (address.page_index *
20                           SPARE_PAGE_SIZE);
21               if (map (sptb, sparePagePtr, true, true, true))
22               {
23                   spareTab[address.data_block_index] = *sptb;
24                   spareUpdate = true;
25                   return true;
26               }
27               else
28               {
29                   sparePagePtr = mem + HIGH_SPARE_PAGES_OFFSET
30                           + (address.page index *
31                               SPARE_PAGE_SIZE);
32                   if (map (sptb, sparePagePtr, false, false, false))
33                   {
34                       spareTab[address.data_block_index] = *sptb;
35                       spareUpdate = true;
36                       return true;
37                   }
38                   else return false;
39               }
40           }
41           else
42           {
43               sparePagePtr = mem + HIGH_SPARE_PAGES_OFFSET +
44                       (address.page_index * SPARE_PAGE_SIZE);
45               if (map (sptb, sparePagePtr, false, true, true))
46               {
47                   spareTab[address.data_block_index] = *sptb;
48                   spareUpdate = true;
49                   return true;
50               }
51               else return false;
52           }
53       }
54       else
55       {
56           sparePagePtr = mem +
57                               LOW_SPARE_PAGES_OFFSET +
58                       (address.page_index * SPARE_PAGE_SIZE);
59           if (map (sptb, sparePagePtr, true, false, false))
60           {
61               spareTab[address.data_block_index] = *sptb;
62               spareUpdate = true;
63               return true;
64           }
65           else
```

-continued

```
66          {
67              sparePagePtr = mem + HIGH_SPARE_PAGES_OFFSET +
68                  (address.page_index * SPARE_PAGE_SIZE);
69              if (map (sptb, sparePagePtr, false, false, false))
70              {
71                  spareTab[address.data_block_index] = *sptb;
72                  spareUpdate = true;
73                  return true;
74              }
75              else return false;
76          }
77      }
78  }
```

Member function "badBlock" remaps the LDBA supplied as argument "address." First, on line 9, badBlock calls member function "spareTable" to ensure that the currently loaded spare table corresponds to LDBA "address." On line 11, badBlock sets the local variable "sptb" to point to the spare table element corresponding to LDBA "address." On line 12, badBlock sets local variable "status" to the value of the status field of the error table element pointed to by variable "sptb." If the status has a non-zero value, as detected on line 14, then the LDBA "address" has been previously remapped, and the previously remapped LDBA "address" is again remapped on lines 16–52. Otherwise, the LDBA "address" is remapped for the first time on lines 56–76. The remapping operation is similar in both cases, and will therefore be described only for the case of initial remapping on lines 56–76. On line 56, the local variable "sparePagePtr" is set to the address of the first byte of the spare page in the low-address spare page region corresponding to LDBA "address." Then, on line 59, badBlock calls the member function "map" to select an available spare block within the spare page on which to remap LDBA "address." If the call to map returns Boolean value "true," as detected on line 59, then the LDBA "address" has been successfully remapped to the spare page pointed to by the variable "sparePagePtr," and the spare table element corresponding to LDBA "address" is updated on lines 61–62. If the attempt to remap LBDA "address" to the corresponding spare page in the low-address spare page region is unsuccessful, then that block similarly attempts to remap LDBA "address" to a spare page within the high-address spare page region on lines 67–75. If badBlock cannot successfully remap LDBA "address," then badBlock returns the Boolean value "false" on line 75.

The memory member function "map" is provided below:

```
1   bool memory::map (BYTE* sptb, BYTE* sparePagePtr, bool low,
2                    bool remap, bool testBlocks)
3   {
4       int i, j;
5       BYTE ssme[NUM_DATA_BLOCKS_IN_SPARE_PAGE];
6       BYTE* ssmePtr;
7       bool proceed;
8       int status = getStatus(sptb);
9
10      try
11      {
12          ssmePtr = sparePagePtr;
13          for(j = 0; j < NUM_DATA_BLOCKS_IN_SPARE_PAGE; j++)
14              ssme[j] = ssmePtr[j];
15          if (remap) ssme[getOffset(sptb)] = SPARES_STATUS_BAD;
16          for(i = 1; i < NUM_DATA_BLOCKS_IN_SPARE_PAGE; i++)
17          {
18              if(ssme[i] == SPARES_STATUS_AVAILABLE)
19              {
20                  if (testBlocks) proceed =
21                      test ((sparePagePtr + (i * BLOCK_SIZE)), BLOCK_SIZE);
22                  else proceed = true;
23                  if (proceed)
24                  {
25                      ssme[i] = SPARES_STATUS_IN_USE;
26                      for (j = 0; j < NUM_DATA_BLOCKS_IN_SPARE_PAGE j++)
27                          ssmePtr[j] = ssme[j];
28                      if (low) setStatus(sptb, LOW_SPARE_STATUS);
29                      else setStatus(sptb, HIGH_SPARE_STATUS);
30                      setOffset(sptb, i);
31                      return true;
32                  }
33              }
34          }
35          return false;
36      }
37
```

```
38      catch ( . . . )
39      {
40          return false;
41      }
42  }
```

Member function "map" attempts to find an available spare block within the spare page for mapping an LDBA. Member function "map" is supplied with a pointer to a spare table element, a pointer to a spare page, and three Boolean arguments that indicate whether the spare page is in the low-address or high-address spare page regions, whether the spare page at the offset indicated by the spare table element should be designated as a bad spare block, and whether the available spare block should be tested prior to remapping. On line 12, local variable "ssmePtr" is set to point to the spare block status map that occupies the initial portion of the first block within the spare page. On lines 13–14, the spare status map is read from memory into variable "ssme." On line 15, the spare block status map is updated to indicate that the spare block referred to by the offset field of the spare table element pointed to by variable "sptb" is bad if the supplied argument "remap" has a Boolean value "true." In the for-loop of lines 16–34, map searches the spare block status map in local variable "ssme" for an available spare block. If an available spare block is found, on line 18, then the spare block status map is updated on line 25, copied back to the spare page on lines 26–27, and the spare table element pointed to by variable "sptb" is updated to reflect the spare block within the spare page to which an LDBA has been remapped.

The memory member function "readBlock" is provided below:

Member function "readBlock" is a public member function called by an accessing device to read a data block described by the LDBA "address" into a buffer described by argument "buff." In the for-loop of lines 6–17, readBlock repeatedly tries to read the block corresponding to supplied LDBA "address." If the block cannot be read, then on line 18, readBlock attempts to remap the block via a call to member function "badBlock." In that case, if badBlock returns Boolean value "true," indicating successful remapping of the block, then readBlock returns the status "READ_FAIL-URE," indicating that the read has failed, but that the LDBA has been successfully remapped to another block. If remapping fails, then readBlock returns status "MEMORY_FAIL-URE" on line 19. Member function "readBlock" calls member function "dataBlock," on line 10, to translate the supplied LDBA "address" to a physical address "m." The contents of the block described by physical address "m" are copied to buffer "buff" in the for-loop on line 12.

Memory member function "writeBlock" is provided below:

```
1   status memory::readBlock (BYTE* buf, LDBA address)
2   {
3       BYTE* m;
4       BYTE* to;
5
6       for (int i = 0; i < RETRIES; i++)
7       {
8           try
9           {
10              if (!dataBlock(address, &m)) return MEMORY_FAILURE;
11              to = buf;
12              for (int j = 0; j < BLOCK_SIZE; j++) *to++ = *m++;
13              return OK;
14          }
15          catch ( . . . ) {
16          }
17      }
18      if (badBlock(address)) return READ_FAILURE;
19      else return MEMORY_FAILURE;
20  }
```

```
1   status memory::writeBlock (BYTE* buf, LDBA address)
2   {
3       BYTE* m;
4       BYTE* from;
5
6       for (int i = 0; i < RETRIES; i++)
7       {
8           try
9           {
10              if (!dataBlock(address, &m)) return MEMORY_FAILURE;
11              from = buf;
12              for (int j = 0; j < BLOCK_SIZE; j++)
13              {
14                  *m++ = *from++;
15              }
16              return OK;
17          }
18          catch ( ... ) {
19          }
20      }
21      if (badBlock(address))
22      {
23          try
24          {
25              if (!dataBlock(address, &m)) return MEMORY_FAILURE;
26              from = buf;
27              for (int j = 0; j < BLOCK_SIZE; j++) *m++ = *from++;
28          }
29          catch ( ... ) {
30              return MEMORY_FAILURE;
31          }
32          return OK;
33      }
34      else return MEMORY_FAILURE;
35  }
```

Member function "writeBlock" is similar to member function "readBlock," described above. However, in the case of member function "writeBlock," if the block described by supplied LDBA "address" cannot be successfully written in the for-loop of lines 6–20, and if remapping of the block can be successfully completed, as detected by writeBlock on line 21, then the write operation is retried on lines 25–27. If writing to the remapped block is successful, then writeBlock returns status "OK" on line 32.

A simple constructor and destructor for class "memory" are provided below:

```
1   memory::memory()
2   {
3
4       for (int i = 0; i < TOTAL_MEM_SIZE; i++) mem[i] = 0;
5       lastUsedPageRegister = -1;
6       spareUpdate = false;
7   }
8
9   memory::~memory()
10  {
11      spareTable(-1);
12  }
```

Although the present invention has been described in terms of a particular embodiment, it is not intended that the invention be limited to this embodiment. Modifications within the spirit of the invention will be apparent to those skilled in the art. For example, as discussed above, the sizes of the regions of memory illustrated in FIG. 2 and corresponding sizes of the page index and data block index fields within an LDBA are quite arbitrary, and may be tailored to fit the requirements of a particular solid-state storage device. The relative locations of the regions illustrated in FIG. 2 may be changed, certain of the regions may be divided and stored separately, further redundant copies of spare tables, for example, may be included in the memory organization scheme, or, by contrast, redundant copies of spare tables may be eliminated. In the C++-like pseudocode implementation, one approach to bad block replacement was described, but many different alternative approaches may be employed. For example, when a bad replacement block is detected, rather than trying to again remap the LDBA within the same spare page in which the bad replacement block is located, a different spare page can be selected in which to find a replacement block. The described write block operation retries a failed write after successful remapping, but, in an alternate embodiment, a second attempt at the write may instead be the responsibility of an accessing device. Many other similar alternatives, including no retrying of failed access operations, are possible. Any number of different software programs can be written to implement the present invention, using different programming languages, modular organizations, data structures, and other such characteristics and parameters. An almost limitless number of different hardware circuit implementations and firmware implementations can be derived based on such software specifications.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A solid-state storage device comprising:
  a physical electronic memory including a spare table region containing spare tables, a spare page region containing spare pages, and a data page region containing data pages;
  said three regions are physically separate and distinct from each other;
  an electronic memory interface that provides, to devices that access the electronic memory, memory operations directed to target data blocks specified by the accessing device via a logical data block address; and
  a logic component that maps a logical data block address to a physical address describing the location of a data block in the electronic memory;
  wherein the logical data block address comprises:
    a page index that indexes a data page within the data page region, a spare table within the spare table region, and a spare page within the spare page region without searching for in a table search; and
    a data block index that indexes a data block within the data page indexed by the page index and a spare table element within the spare table indexed by the page index without searching for in a table search.

2. The solid-state storage device of claim 1 wherein, in order to map a logical data block address to a physical address, the logic component:
  extracts the page index and data block index from the logical data block address;
  uses the page index to locate a corresponding spare table;
  uses the data block index to locate a corresponding spare table element within the corresponding spare table;
  when a status indication within the corresponding spare table element indicates that the logical data block address has been remapped,
    uses a page offset within the corresponding spare table element and the page index extracted from the logical data block address to determine the physical address of a spare data block, within a spare page, that corresponds to the logical data block address; and
  when a status indication within the corresponding spare table element indicates that the logical data block address has not been remapped,
    uses the page index and data block index to determine the physical address of a data block, within a data page, that corresponds to the logical data block address.

3. The solid-state storage device of claim 1 wherein the electronic memory includes:
  a first spare table region;
  a first spare page region;
  a data page region;
  a second spare page region; and
  a second spare table region.

4. The solid-state storage device of claim 3 wherein the first spare table region occupies a first, lower addressed portion of the electronic memory, the first spare page region occupies a second, next lower addressed portion of the electronic memory, the data page region occupies a third, middle portion of the electronic memory, the second spare page region occupies a fourth, higher addressed portion of the electronic memory, and the second spare table region occupies a fifth, highest addressed portion of the electronic memory.

5. The solid-state storage device of claim 4 wherein a logical data block contains a 16-bit page index and a 16-bit data block index, wherein a data page contains up to $2^{16}$ data blocks, wherein a spare page contains up to $2^7-1$ data blocks, wherein the data page region contains up to $2^{16}$ data pages, wherein both the first and second spare page regions contain up to $2^{16}$ spare tables, wherein a spare table includes up to $2^{16}$ spare table elements, and wherein both the first and the second spare table regions contain $2^{16}$ spare tables.

6. The solid-state storage device of claim 3 wherein redundant copies of the spare tables of the first spare table region are stored in the second spare table region.

7. The solid state storage device of claim 3 further including:
  a spare table cache and a cached spare table identifier register.

8. The solid state storage device of claim 7 wherein, in order to map a logical data block address to a physical address, the logic component:
  extracts the page index and data block index from the logical data block address;
  uses the page index to locate a corresponding spare table;
  determines, by comparing the page index extracted from logical data block address to the contents of the cached spare table identifier register, whether the spare table cache contains the contents of the located corresponding spare table;
  when the spare table cache does not contain the contents of the located corresponding spare table,
    copies the located corresponding spare table into the spare table cache;
  uses the data block index to locate a corresponding spare table element within the spare table cache;
  when a status indication within the corresponding spare table element indicates that the logical data block address has been remapped,
    uses a page offset within the corresponding spare table element and the page index extracted from the logical data block address to determine the physical address of a data block, within a spare page, that corresponds to the logical data block address; and
  when a status indication within the corresponding spare table element indicates that the logical data block address has not been remapped,
    uses the page index and data block index to determine the physical address of a data block, within a data page, that corresponds to the logical data block address.

9. The solid-state storage device of claim 1 wherein a spare table contains a number of elements equal to the number of data blocks in a data page, wherein the spare table region contains a number of spare tables equal to the number of data pages within the data page region, wherein the spare page region contains a number of spare pages equal to the number of data pages within the data page region, and wherein a spare page contains a fixed number of data blocks, including a first data block that contains a spare block status map that contains spare block status map elements that store status information for data blocks stored within the spare page.

10. The solid-state storage device of claim 1 wherein a logical data block contains a 16-bit page index and a 16-bit data block index, wherein a data page contains up to $2^{16}$ data blocks, wherein a spare page contains up to $2^7-1$ data blocks, wherein the data page region contains up to $2^{16}$ data pages, wherein a spare page region contains up to $2^{16}$ spare tables, and wherein a spare table includes up to $2^{16}$ spare table elements.

11. A method for transforming a logical data block address into a physical electronic memory address, the method comprising:
   providing an electronic memory having a spare table region containing spare tables, a spare page region containing spare pages, and a data page region containing data pages;
   said three regions are physically separate and distinct from each other;
   extracting a page index and a data block index from the logical data block address; and
   using the extracted page index and data block index to identify the address of a physical data block within the electronic memory corresponding to the logical data block address;
   wherein the logical data block address comprises:
      a page index that indexes a data page within the data page region, a spare table within the spare table region, and a spare page within the spare page region without searching for in a table search; and
      a data block index that indexes a data block within the data page indexed by the page index and a spare table element within the spare table indexed by the page index without searching for in a table search.

12. The method of claim 11 further including:
   using the extracted page index as an offset to locate a spare table within the spare table region;
   using the extracted data block index as an offset to locate a spare table element within the spare table;
   when a status indication within the spare table element indicates that the logical data block address has been remapped,
      using the page index extracted from the logical data block address to determine the physical address of a spare page within the spare page region;
   using a page offset within the spare table element to determine the physical address of a data block within the spare page; and
   when a status indication within the corresponding spare table element indicates that the logical data block address has not been remapped,
      using the page index from the logical data block address to determine the physical address of a data page within the data page region, and
      using the data block index as an offset to determine the physical address of a data block within the data page.

13. The method of claim 12 further including:
   when a status indication within the spare table element indicates that the logical data block address has been remapped,
      using the status indication to determine whether the data block is in a low spare page region or a high spare page region and to select the indicated spare page region;
      using the page index extracted from the logical data block address to determine the physical address of a spare page within the selected spare page region;
      using a page offset within the spare table element to determine the physical address of a spare data block within the spare page.

14. The method of claim 12 further including:
   after using the extracted page index as an offset to locate a spare table within the spare table region, and before using the extracted data block index as an offset to locate a spare table element within the spare table,
      checking a register to determine whether a currently cached spare table corresponds to the logical block address, and when the currently cached spare table does not correspond to the logical block address, copying the located spare table within the spare table region to a memory cache.

15. The method of claim 14 further including:
   when the currently cached spare table does not correspond to the logical block address, and when the contents of the currently cached spare table has been changed since the currently cached spare table was copied to the memory cache, copying the currently cached spare table back to the spare table region prior to copying the located spare table within the spare table region to the memory cache.

16. A method for remapping a logical data block address to a different physical electronic memory address, the method comprising:
   providing an electronic memory having a spare table region containing spare tables, a spare page region containing spare pages, and a data page region containing data pages;
   said three regions are physically separate and distinct from each other;
   extracting a page index and a data block index from the logical data block address;
   using the extracted page index and data block index to select the address of a physical data block within a spare page in the spare page region of the electronic memory to which to remap the logical data block address; and
   storing indications within an element of a spare table corresponding to the logical data block address that remap the logical data block address to the selected address;
   wherein the logical data block address comprises:
      a page index that indexes a data page within the data page region, a spare table within the spare table region, and a spare page within the spare page region without searching for in a table search; and
      a data block index that indexes a data block within the data page indexed by the page index and a spare table element within the spare table indexed by the page index without searching for in a table search.

17. The method of claim 16 further including:
   using the extracted page index as an offset to locate a spare table within the spare table region;
   using the extracted data block index as an offset to locate a spare table element within the spare table;
   when a status indication within the spare table element indicates that the logical data block address has been remapped,
      using the page index extracted from the logical data block address to determine the physical address of a spare page within the spare page region;
      using a page offset within the spare table element to determine the physical address of a spare block status map element within a spare block status map in the first data block within the spare page corresponding to the logical data block address;

setting an indication in the spare block status map element to indicate that a corresponding data block within the spare page is no longer used;

searching the spare block status map within the spare block status map in the first data block within the spare page to select a spare block status map element indicating that a corresponding data block is available;

setting an indication in the selected spare block status map element indicating that the corresponding data block is in use; and setting indications in the spare table element to indicate that the logical data block address is remapped to data block within the spare page corresponding to the selected spare block status map.

* * * * *